United States Patent Office 3,651,213
Patented Mar. 21, 1972

3,651,213
METHOD FOR THE IMMUNIZATION OF A LIVING ANIMAL BODY AGAINST VIRAL DISEASE
Craig Wallis and Joseph L. Melnick, Houston, Tex., assignors to Monsanto Company, St. Louis, Mo.
No Drawing. Filed May 29, 1969, Ser. No. 829,148
Int. Cl. A61k 27/00
U.S. Cl. 424—89                 7 Claims

ABSTRACT OF THE DISCLOSURE

Increased antibody production is obtained in a living animal body by injecting a living animal body susceptible to virus attack with a complex of a virus and a water-insoluble polyelectrolyte polymer containing basic groups. The polymer is polycationic or polyampholytic in nature and contains imide groups in the form of diloweralkylaminoloweralkylimide groups or loweralkyliminodi(loweralkylimide) linkages. Exemplary of the virus-polyelectrolyte complex is the product of polio virus and a crosslinked dimethylaminopropylimide derivative of isobutylene/maleic anhydride copolymers.

BACKGROUND OF THE INVENTION

Field of the invention

This invention relates to an improved method for the immunization against viral disease of a living animal body susceptible to virus attack. In one aspect this invention relates to an improved method for immunization of a living animal body against attack by virus by forming a complex of a virus and a water-insoluble polyelectrolyte polymer and injecting the complex into the living animal body to produce antibodies in the living animal body specific against the virus. In a further aspect, this invention relates to an improved method for the production of immune serum by forming a complex of a virus and a water-insoluble polyelectrolyte polymer, injecting a living animal body with the said complex to produce antibodies against the virus in the living animal body, and recovering immune serum containing the antibodies from the living animal body.

DESCRIPTION OF THE PRIOR ART

Immunization of a living animal body against viral disease is typically accomplished by injecting the subject with a vaccine containing live, attenuated or "killed" virus to permit the subject to react to the virus and thereby produce antibodies effective against the virus. Immunization against viral disease may also be effected by injecting the subject with immune serum containing antibodies which are effective against a specific virus. Immune serum is typically obtained by injecting live, attenuated or "killed" virus into a living animal body to produce antibodies against the virus and then recovering immune serum containing the antibodies from the subject. While these procedures are widely employed, the quantity and specificity of antibodies produced thereby is typically low and the maximum period of immunization is often of short duration.

It will be apparent to one skilled in the art that the importance and practical significance of increased and more specific antibody titers and the provision of improved and more specific immune sera containing increased numbers of antibodies, lies in the superior effects which are obtained upon the immunization of a living animal body in the usual manner with the same. Obviously, when the immunized animal body is subjected to challenge with the virus of the PE-virus complex or a closely related virus of the same type as the virus of the PE-virus complex employed in preparing the antibodies and/or immune sera, any improvement in antibody titer and strength of the immune sera will give improved results upon challenge of the immunized living animal body with a virus of the same or similar type as that employed in producing the antibodies and/or immune sera.

Originally, and currently, virus vaccines have been and are being prepared in the chicken or duck embryonated egg. Also, since the introduction of tissue culture procedures, many virus vaccines are being prepared in cultures of a variety of cells originating from simian, human, canine, avian, and rodent sources. As an example, chicken and duck embryonated eggs, when used to grow viruses, are harvested by obtaining embryonic fluids and organs containing the virus. Thus, the harvest contains not only virus, but also many proteinaceous substances from the host. Since a major portion of the harvest consists of non-viral proteins, the injection of vaccines made from such materials will elicit a response in man or animals not only to the virus but also to the many associated non-viral proteins. Under such conditions, these extraneous foreign non-viral proteins will in many cases sensitize man and aminals, and subsequent re-injections of similar materials may lead to untoward reactions, and even to fatal anaphylactic shock.

Similarly, virus harvests made in tissue cultures will contain, besides the virus, an assortment of proteins derived from the medium used to maintain such cultures, and also cellular proteins released when cell lysis takes place during virus replication, or when the cells are disrupted by laboratory procedures to release intracellular virus. The administration of such preparations subjects the vaccine to foreign, sensitizing proteins as described above.

In addition to the problem of foreign proteins, vaccine preparations are only as effective as the antigenicity of the viruses present therein. An important factor in the antigenicity of a virus vaccine is the number of virus particles present. Thus, virus vaccines containing low numbers of virus particles may be inefficient as immunizing agents. Therefore the concentration of virus preparations, to yield viral particles in sufficient numbers to contain an adequate concentration of immunizing antigens, is a desirable improvement in vaccine production.

The surprising discovery has now been made that certain insoluble polyelectrolytes containing a particular type of imide linkage will preferentially adsorb viruses contained in harvests of virus-infected tissue cultures or in harvests of virus-infected chicken or duck embryo. Once the viruses are adsorbed to the polyelectrolytes (Pe's), the fluids containing the non-viral protein are discarded, and the viruses are concentrated on the PE's; the viruses are then eluted therefrom to yield virus suspensions free of non-viral proteins. The total volume of fluids used to elute the viruses from the PE's can be so predetermined as to concentrate the viruses 10X or 100X, thereby yielding virus preparations of high purity and in concentrated form. Such preparations can now be used for vaccines, either live, attenuated or killed as the case may be.

The efficient killing of viruses by reagents such as Formalin is affected by the presence of organic components derived from the virus harvest, since such organic materials interfere with the activity of Formalin. Thus, in working with conventional virus harvests, the killing of viruses present therein by treatment with Formalin requires a prolonged period of incubation (3 to 4 days) at 37° C., before 100% virus inactivation is effected. Under these conditions, a large amount of thermal inactivation takes place along with the Formalin inactivation, and the 37° temperature also renders non-antigenic a large portion of the virus antigen originally present in the virus harvest. By use of purified virus preparations as described in this application, formalization proceeds expeditiously, requiring only several hours at 37° C. for inactivation of the virus population; the time during which the preparation is subject to thermal inactivation is hence greatly reduced. Furthermore, since the virus may be eluted, as by a salt solution, and since experimental results have shown that chiefly nitrogenous matter of virus origin is recovered in the eluate, use of these purified concentrates is clearly advantageous for the preparation of killed or live virus vaccines.

SUMMARY OF THE INVENTION

The present invention resides in the discovery that improved immunization of a living animal body against virus attack is accomplished by injecting the animal with a complex of a virus and a particular type of basic water-insoluble polyelectrolyte polymer. By this procedure immune serum containing increased amounts of antibodies specific against the virus is produced in the animal, which can if desired then be recovered from the animal and used in the immunization of other living animal bodies. The polymer employed is polycationic or polyampholytic in nature and contains imide groups which are present in the form of diloweralkylaminoloweralkylimide groups as or loweralkyliminodi(loweralkylimide) linkages. By this method increased antibody production is obtained in living animal bodies including mammals such as dogs, cats, cattle, swine, horses and primates, for example, monkeys.

According to the invention, PE's are employed in and for the efficient immunization of animals, by forming a virus-PE complex and injecting this complex into animals. Injection of crude virus, or of purified virus, into animals for preparation of immune serum, as presently practiced, presents many problems. Primarily, injection of the virus into animal tissues exposes the injected virus to rapid catabolism and excretion by the host. According to the PE invention, injection of the virus firmly bound to a PE localizes the virus for prolonged periods of time as the virus is gradually released from the PE at a site within the injected animal. Furthermore, since the virus is adsorbed to the PE in purified form and free of extraneous proteins of the substrate from which the virus preparation was derived (e.g., tissue culture or embryonated eggs), the animal reacts specifically to the virus, and the immune serum obtained from the animal contains antibody against the virus under test and is free of antibodies against other antigens.

DETAILED DESCRIPTION

The polyelectrolyte polymer used in the present invention is water-insoluble. Many of the normally water-soluble polyelectrolyte polymers are converted to the water insoluble form by introduction of sufficient crosslinks in known manner. Crosslinking may be accomplished either during preparation of the polymer or by subsequent treatment of the polymer to make the polymer insoluble in water. Typical crosslinking agents include divinylbenzene, ethylene diamine and methyliminobispropylamine. Other crosslinking agents are known from U.S. Pat. 3,165,486. When methyliminobispropylamine or other loweralkyliminobisloweralkylamine is employed as the crosslinking agent, loweralkyliminodi(loweralkylimide) linkages are introduced into the polymer. The water-insolubility of the polymer can be varied by regulation of the degree of crosslinking of the polymer. The term "water-insoluble" as used herein is taken to mean that the polymer concerned does not dissolve in water or aqueous solution even though it may have such characteristics as a high degree of swelling due to solvation by water, even to the extent of existence in a gel form. Such characteristics are typically imparted by crosslinking.

By "polyelectrolyte" it is intended to include only polymeric organic substances which when contacted with an aqueous medium or aqueous alkaline or aqueous acidic medium possess organic ions having electrical charges distributed at a plurality of positions thereon.

Copolymers herein are frequently conveniently identified in terms of their monomeric constituents. The names so applied refer to the molecular structure and are not limited to the polymers prepared by the copolymerization of the specified monomers. In many instances the identical copolymers may be prepared from other monomers and converted by subsequent chemical reaction to the desired copolymer.

Polyelectrolyte polymers which are preferred for use in the present invention are basic polymeric polyelectrolytes selected from the group consisting of (A) a polymerized unsaturated carboxylic acid or anhydride and an imide derivative of a polymerized unsaturated carboxylic acid or anhydride (B) an imide derivative of a polymerized unsaturated carboxylic acid or anhydride and (C) a copolymer of (1) an unsaturated monomer having, for example, 2 to 30 carbon atoms and (2) a monomer selected from the group consisting of (a) an unsaturated carboxylic acid or anhydride and an imide derivative of an unsaturated carboxylic acid or anhydride and (b) an imide derivative of an unsaturated carboxylic acid or anhydride. Preferably the polyelectrolyte polymer has an average molecular weight of at least 1,000 and a degree of polymerization of at least 8. It is preferred that the polymer, that is the reactive sites in the polymer, contain a substantial number (e.g. 2–100%) of diloweralkylaminoloweralkylimide groups.

The polyelectrolyte polymer employed may advantageously be an EMA-type polymer.

Among the EMA-type polymers suitable for the practice of the present invention are polymeric polyelectrolytes subject to the previously noted requirements having units of the formula wherein: $R_A$ and $R_B$ are selected from the group consisting of hydrogen, halogen (preferably chlorine), alkyl of 1 to 4 carbon atoms (preferably methyl), cyano, phenyl, or mixtures thereof; provided that not more than one of $R_A$ and $R_B$ is phenyl; Z is a bivalent radical (preferably alkylene, phenylalkylene, alkoxyalkylene, and aliphatic acyloxyalkylene) of 1 to 18 carbon atoms, preferably a bivalent carbon chain of 1 to 4 carbon atoms inclusive, which is a part of a unit containing 1–18 carbon atoms, inclusive, *q* is zero or one, X and Y are selected from hydroxy, —O alkali metal, OR, $—OH—NH_3$, $—OH—R_3N$, $—OH—R_2NH$, $—OH—RNH_2$, —NRR′, $$—(Q)_p—W—(NR'R')_x$$

and $—(Q)_p—W—(—OH)_x$, wherein *x* is 1 to 4 and *p* is zero or one, wherein R is selected from the group consisting of alkyl, phenylalkyl or phenyl, the alkyl group containing 1–18 carbon atoms, wherein R′ is H or R, wherein Q is oxygen or —NR'—, and wherein W is a bivalent radical preferably selected from alkylene, phenylene and phenylalkene having up to 20 carbon atoms, X and Y taken together can be oxygen or —NR—, —N—W—(NR'R')$_x$ or —N—W—(NR'R'R")$_x$+ wherein R, W, R' have the meanings previously assigned and R" is alkyl of 1 to 18 carbon atoms, benzyl or aromatic-substituted benzyl. The units of the formula given above are recurring, n being at least 8 and can be as much as 100,000 degrees of polymerization. When the units are recurring the symbols in the various recurring units do not necessarily stand for the same thing in all of the recurring units.

Many of these polymers suitable for the practice of the present invention or suitable after conversion to derivatives are commercially available. Such polymers containing the requisite imide groups are water-insoluble and polycationic or polyampholytic in nature.

The polycarboxylic acid polymers can be of the non-vicinal-type including those containing monomer units, such as acrylic acid, acrylic anhydride, methacrylic acid, crotonic acid or their respective derivatives, including partial salts, amides and esters or of the vicinal type, including maleic, itaconic, citraconic, a-dimethyl maleic, a-butyl maleic, a-phenyl maleic, fumaric, aconitic, a-chloromaleic, a-bromomaleic, a-cyanomaleic acids including their salts, amides and esters. Anhydrides of the foregoing acids are also advantageously employed.

Co-monomers suitable for use with the above polycarboxylic acid monomers include a-olefins, such as ethylene, 2-methyl-pentene-1, propylene, butylene, 1- or 2-butene, 1-hexane, 1-octene, 1-decene, 1-dodocene, 1-octadecene, and other vinyl monomers, such as styrene, a-methyl styrene, vinyltoluene, vinyl acetate, vinyl chloride, vinyl formate, vinyl alkyl ethers, e.g. methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said carboxylic acids or derivatives may be copolymerized with any of the other monomers described above, and any other monomer which forms a copolymer with carboxylic acids or derivatives. Although these copolymers can be prepared by direct polymerization of the various monomers, frequently they are more easily prepared by an after-reaction modification of an existing copolymer. Copolymers are conveniently identified in terms of their monomeric constituents. The names so applied refer to the molecular structure and are not limited to the polymers prepared by the copolymerization of the specified monomers.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the alkyl or other esters and amides, alkyl amides, dialkyl amides, phenylalkyl amides or phenylamides prepared by reacting carboxyl groups on the polymer chain with the selected amines or alkyl or phenylalkyl alcohol, as well as amino esters, amino amides, hydroxy amides and hydroxy esters, wherein the functional groups are separated by alkylene, phenyl, phenylalkyl, phenylalkylphenyl, or alkylphenylalkyl or other aryl groups. Moieties bearing amine or amine salts including quaternary salt groups are conveniently formed by reaction of the carboxyls of their anhydride precursors, where applicable with polyfunctional amines such as dimethylaminopropylamine at higher temperatures forming an imide linkage with vicinal carboxyls. Such pendant free amine groups can then be converted, if desired, to their simple or quaternary salts.

Representative EMA-type carboxylic acid or anhydride-olefin polymers, especially maleic acid or anhydride-olefin polymers of the foregoing type are known, for example, from U.S. Pats. 2,378,629; 2,396,785; 3,157,595; and 3,340,680. Generally, the copolymers are prepared by reacting ethylene or other unsaturated monomer, or mixtures thereof, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 100,000 preferably about 100 to 5,000, and a molecular weight of about 1,000 to 1,000,000 preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. Numerous of these polymers are commercially available.

Derivatives containing basic or cationic groups can be prepared by any convenient procedure. Representative derivatives of polymers employed in the present invention are known to the art, for example, from U.S. Pat. 3,398,092. As already indicated, at least a portion of the basic groups are diloweralkylaminoloweralkylimide groupings or loweralkyliminodi(loweralkylimide) linkages. Such products are further illustrated by the following preparations and examples.

Partial imides of a starting carboxyl or carboxylic acid anhydride containing polymer, e.g., EMA, are produced by:

(A) Heating a limiting amount of a secondary or tertiary aminoloweralkylamine with the anhydride or carboxyl-containing form of the polymer in a suitable solvent (e.g. xylene) at a temperature of about 140–150° C. until water is no longer given off. Such a reaction simultaneously results in formation of imide groups in proportion to the amount of amine added and in the reformation of anhydride groups for the remainder of the polymer units. In this manner, imide-polymer products are formed which typically possess 2–100% imide linkages, the remaining carboxyl groups, when present, being in the anhydride form.

(B) Alternatively, a partial amide polymer product may be converted to the partial imide polymer product by heating a partial amide polymer product in vacuo at 140–150° C. until water is no longer given off. Such an imide polymer product likewise possesses comparable proportions of imide and anhydride groups depending upon the number of amide groups originally contained in the starting partial amide-polymer product.

Partial secondary or tertiary aminoloweralkylamides of the starting carboxyl or carboxylic acid anhydride-containing polymer, e.g., EMA, are obtained by contacting the polymer with a limiting amount of the selected amine in suspension in a solvent such as benzene or hexane, resulting in formation of a partial amide-acid-anhydride derivative of the polymer, or a corresponding amide-carboxylate derivative thereof. The number of amide groups is dependent upon the quantity of the amine used as compared with the quantity of polymer employed. Such amide-polymer products typically comprise 2–100% amide groups, with remaining carboxyl groups being present as acid or anhydride groups.

Suitable blocking and unblocking of the amine moiety of the reactant employed in preparing amides or imides may be effected when required. Residual, non-modified, polymer units may optionally be converted to neutral groups or units by attachment to the polymer molecule of compounds including alkylamines, aminoalcohols, and alcohols.

Alternatively, additional cationic character can be provided in the polymer through incorporation of monomers which impart a basic or cationic character such as C-vinyl pyridines, vinyl amine, the several amino-substituted vinyl benzenes (or toluenes, etc.), amine-bearing acrylates, or methacrylates, etc.), vinyl imidazole, etc.

Thus, in any event, the polymer product will have residual active or reactive groups which may be of various types, including mixtures, but these residual active or reactive groups or residual "reactive sites" in the polymer will in one way or another comprise a certain percentage which are of a basic nature, so as to impart the requisite basic nature to the polymer product.

As will be apparent from the foregoing, the essential basic groups of the polycationic or polyampholytic polyelectrolyte (PE) employed are of an imide nature, involving diloweralkylaminoloweralkylimide groupings, as produced by reacting a diloweralkylaminoloweralkylamine with the carboxyl groups of a pre-formed polymer or by polymerizing an unsaturated olefin with an unsaturated anhydride or acid having such pre-formed imide groups in at least a portion of the unsaturated polycarboxylic acid reactant. According to the invention, such groups are preferred for purposes of the invention. Alternatively, whether such groups are or are not present, imide groups may be provided by crosslinking the polymer with a loweralkyliminobis(loweralkylamine), which in the process of crosslinking by reaction between the terminal amine groups of the crosslinker and carboxyl groups in the polymer chain is productive of imido groups at both ends of the crosslinking chain with formation of the desired loweralkyliminobis(loweralkylimide) linkages. Also, diloweralkylaminoloweralkyl ester groups may be present, as well as other groups, so long as the prescribed percentages of imide groups of the prescribed type are also present in the PE molecule as well as the residual acid groups of the starting unsaturated acid or anhydride when the PE is a polyampholyte. As will be recognized, both the acid groups and the imide groups need not necessarily be present in the PE as such, but may be present in the form of their simple derivatives, e.g., salts, as already indicated.

The complex of virus and polyelectrolyte may be formed by any suitable procedure. One such procedure consists of adding the polyelectrolyte to an aqueous medium containing the virus to sorb the virus to the polyelectrolyte and removing the polyelectrolyte complex containing the sorbed virus from the medium. The effectiveness of a particular PE in adsorbing a particular virus is particularly related to the pH of the medium from which the virus is sorbed and the isoelectric pH (IEpH) of the PE, the virus and any non-viral protein present in the medium as will become more readily apparent hereinafter. Determination of the IEpH of the above-mentioned is within the skill of the art. IEpH of representative PE's has been determined in isotonic (0.15 M) saline and is given in Table 1. The effectiveness of a particular polyelectrolyte in sorbing virus from a particular medium is readily determined by the skilled worker, for example, by adding the polyelectrolyte to the aqueous medium containing the virus and adjusting the pH of the aqueous medium to that pH whereby maximum sorption of virus occurs. Sorption of the virus on the polyelectrolyte is determined by removing the polyelectrolyte containing the sorbed virus from the aqueous medium and testing the medium for virus. Maximum sorption is deemed to have occurred when the aqueous medium is substantially free of virus.

The following preparations and examples are given by way of illustration only.

TABLE 1

| Copolymer | Percent dimethylaminopropylimide | IEpH |
|---|---|---|
| Ethylene/maleic anhydride copolymer | [1] 2 | 3.10 |
| | 5 | 4.01 |
| | 10 | 3.98 |
| | 15 | 4.00 |
| | 20 | 4.46 |
| | 30 | 4.90 |
| | 50 | 5.87 |
| | 70 | 8.54 |
| | 100 | 10.30 |
| Isobutylene/maleic anhydride copolymer | 5 | 2.65 |
| | 10 | 2.64 |
| | 15 | 2.73 |
| | 20 | 3.05 |
| | 30 | 3.75 |
| | 50 | 7.68 |
| | 70 | 8.13 |
| | 100 | 9.20 |
| Styrene/maleic anhydride copolymer | 5 | 2.96 |
| | 10 | 2.95 |
| | 15 | 3.48 |
| | 20 | 3.62 |
| | 30 | 3.79 |
| | 50 | 5.85 |
| | 70 | 7.76 |
| | 100 | 9.63 |
| 2-methyl pentene-1/maleic anhydride copolymer | 5 | 3.13 |
| | 10 | 3.40 |
| | 15 | 4.00 |
| | 20 | 4.87 |
| | 30 | 6.70 |
| | 50 | 7.98 |
| | 70 | 8.15 |
| | 100 | 8.82 |

[1] Methyliminobis (propylimino) linkages.

PREPARATION 1

This preparation illustrates the preparation of a typical maleic acid/$C_2$–$C_{12}$ monoolefin copolymer useful in the preparation of active adsorbent derivatives. A 3-liter glass reactor, fitted with reflux condenser and motor-driven stirring device was charged with 52.3 g. of maleic anhydride, 55.7 g. of styrene, 1500 ml. of benzene, 2.53 g. of 55% active divinyl benzene, equivalent to 1.39 g., or 1 mol percent of active crosslinking agent, and 0.275 g. of benzoyl peroxide. The reactants are heated to the temperature of refluxing benzene and maintained at this temperature with good mixing for 3.5 hours. The polymer was filtered, washed upon the filter with benzene and finally dried in the vacuum oven for 16 hours at 100° C. An essentially quantitative yield of cross-linked styrene/maleic anhydride copolymer was obtained.

PREPARATION 2

A predetermined percentage of anhydride groups in the maleic anhydride copolymer, such as prepared in Preparation 1, can be converted to substituted imide groups by a simple two-step process. To prepare a product containing 50% imide linkages, 0.5 molar unit of styrene/maleic anhydride polymer from Preparation 1, was charged to a glass 1 liter reactor fitted with mechanical stirrer and graduated water trap topped by a reflux condenser. The reactor was then charged with 500 ml. dry xylene and 0.25 mol of a dialkylaminoalkylamine added. A representative amine of this class is the dimethylaminopropylamine. As the reactants were gently warmed with good mixing, the anhydride linkage was opened and the N-substituted amide formed. Heating was continued and the temperature raised to reflux the xylene and to carry off azeotropically the water of reaction as the imide linkages formed.

After the theoretical quantity of water had been distilled from the reactor, the solvent was stripped off under reduced pressure and the product copolymer derivative dried in a vacuum oven.

PREPARATION 3

The copolymer from Preparation 2 containing 50% substituted imide linkages is suitable for use in the present invention. For certain applications a copolymer having a percentage of quaternary salt hydrophilic groups can be prepared by reacting the substituted imide with an alkyl halide. It is possible to convert a calculated proportion of the tertiary nitrogen atoms to quaternary nitrogen atoms by the simple method of warming a suspension of the polymer with a calculated amount of alkyl halide. An inert diluent such as benzene can be employed for the preparation of the quaternary ammonium derivatives. A calculated weight of the imide substituted copolymer, as prepared in Preparation 2, was suspended in benzene to which was added an alkyl halide. The reaction proceeds readily at temperatures from 40 to 60° C. when a halide such as methyl iodide was employed. A reaction period of 30 minutes or less is usually sufficient when an active halide such as a benzyl halide or a lower alkyl halide is employed. If the halide be a chloride, the reaction time is somewhat longer than if the halide portion of the molecule be bromide or iodide. After the heating period was completed, the diluent was stripped off at reduced pressure and the polymer dried in a vacuum oven.

PREPARATION 4

The hydrophilic properties of the various copolymers suitable for the practice of our invention can be increased by an ammoniation step. Ammonia gas is used to convert unreacted anhydride linkages in the copolymer to the half-amide, half-ammonium salt. This reaction can be carried out by adding ammonia to the dry polymer while using thorough mixing, or the ammonia can be added to a suspension of the copolymer in an inert diluent such as benzene. The ammoniation step has been successfully conducted using copolymer as prepared, or can be carried out with a derivative of the copolymer, e.g., copolymer containing imide linkages, copolymer containing substituted imide linkages, or copolymer containing quaternary ammonium compounds prepared from the partial imides.

The ammoniation reaction is accompanied by a temperature rise and proceeds rapidly to 100% conversion of the anhydride linkages. If the reaction is conducted with the dry polymer, excess adsorbed ammonia is stripped from the polymer by treating it under reduced pressure to remove the ammonia. If the ammoniation is conducted with a polymer suspension, excess ammonia is removed along with the inert diluent which is stripped off under reduced pressure.

PREPARATION 5

Preparation of partial dimethylaminopropyl imide, partial butyl imide derivative of crosslinked isobutylene maleic anhydride copolymer Xylene (1 liter) is charged to a reaction vessel equipped with reflux condenser, Dean-Stark water trap and stirrer. Methylimino - bis - propylamine (1.45 grams) and 1:1 molar copolymer of isobutylenemaleic anhydride (38.5 grams) are added with stirring. The stirred mixture is heated to reflux temperature (140° C.) and is maintained at said temperature for 1 hour. Upon completion of the 1 hour period, dimethylaminopropyl amine (6.38 grams) is added over a three hour period, during which period reflux temperature is maintained. To the resulting reaction mixture is then added butylamine (13.7 grams). Reflux of the reaction mixture is continued for three additional hours. It is then cooled and filtered. The solid product is washed with hexane and dried. The partial dimethylaminopropyl imide, partial butyl imide derivative of crosslinked isobutylene maleic anhydride copolymer is obtained.

PREPARATION 6

Preparation of partial ester aminoamide, partial dimethylaminopropyl amide, partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams) and 1:1 molar copolymer of ethylene-maleic anhydride (63.0 grams) are added with stirring. The stirred mixture is heated to reflux temperature (140° C.) and is maintained at said temperature for 1 hour. Upon completion of the 1 hour period dimethylaminopropyl amine (12.75 grams) is added over a three hour period during which period reflux temperature is maintained. The mixture is cooled to 90° C. and additional dimethylaminopropyl amine (12.75 grams) is added. The temperature is maintained at 90° C. for 3 hours. Butanol (18.5 grams) is then added and the temperature is maintained at 90° C. for an additional 2 hour period. The reaction mixture is then cooled and filtered. The solid product is washed with hexane and dried. The partial ester aminoamide, partial dimethylaminopropyl amide, partial dimethylaminopropyl imide derivative of crosslinked ethylene-maleic anhydride copolymer is obtained.

PREPARATION 7

Preparation of partial dimethylaminoethyl ester, partial diethylaminobutyl imide derivative of crosslinked 2-methylpentene-1/maleic anhydride copolymer Xylene (1 liter) is charged to a reaction vessel equipped with reflux condenser, Dean-Stark water trap and stirrer. Methylimino - bis - propylamine (2.9 grams) 1:1 copolymer of 2-methylpentene-1/maleic anhydride copolymer (92.0 grams) and diethylaminobutyl amine (7.2 grams) are added with stirring. The stirred mixture is heated to reflux temperature (140° C.) and maintained at said temperature for 1 hour. The mixture is cooled to 100° C. and dimethylaminoethanol (45.0 grams) is added. The temperature of the reaction mixture is maintained at 100° C. for 5 hours. It is then cooled and filtered. The solid product is washed with hexane and dried. The partial dimethylaminoethyl ester, partial diethylaminobutyl imide derivative of crosslinked 2-methylpentene-1/maleic anhydride copolymer is obtained.

PREPARATION 8

Preparation of partial dimethylaminopropyl imide derivative of crosslinked ethylene-maleic anhydride copolymer Xylene (1 liter) is charged to a reaction vessel equipped with reflux condenser, Dean-Stark water trap and stirrer. Methylimino-bis-propylamine (2.9 grams), 1:1 molar copolymer of ethylene-maleic anhydride and dimethylaminopropyl amine (5.1 grams) are added with stirring. The stirred mixture is heated to reflux temperature (140° C.) and maintained at said temperature for 4 hours. The resulting reaction mixture is cooled and filtered. The solid product is washed with hexane and dried. The partial dimethylaminopropyl imide derivative of crosslinked ethylene-maleic anhydride copolymer is obtained.

PREPARATION 9

The sodium salt of partial dimethylaminopropyl imide derivative of crosslinked ethylene-maleic anhydride is produced upon addition of sodium hydroxide to water containing partial dimethylaminopropyl imide derivative of crosslinked ethylenemaleic anhydride.

PREPARATION 10

The calcium salt of partial dimethylaminopropyl imide derivative of crosslinked ethylene-maleic anhydride is produced by adding partial dimethylaminopropyl imide derivative of crosslinked ethylene-maleic anhydride to water containing calcium hydroxide.

In the same manner other PE's utilizable in the present invention may be prepared.

PREPARATION 11

100 ml. of polio virus harvest containing $10^8$ PFU/ml. were diluted tenfold with distilled water. The pH of the diluted virus harvest was adjusted to 5.5 with hydrochloric acid. One gram of water-insoluble crosslinked isobutylene/maleic anhydride copolymer containing 15% dimethylaminopropylimide groupings was added to the diluted harvest and the resulting suspension was stirred for one hour. The suspension was then centrifuged for five minutes at 2000 r.p.m. and the supernatant fluid was decanted. A complex of polio virus and crosslinked dimethylaminopropylimide derivative of isobutylene/maleic anhydride copolymer was obtained. (The polymer is referred to hereinafter as dimethylaminopropylimide of isobutylene/maleic anhydride copolymer and is abbreviated as follows, IBMA.DMAPI (15%).)

EXAMPLE 1

Preparation: Type 1 poliovirus was used as a model virus, and a methyliminobispropylamine crosslinked isobutylene/maleic anhydride, having 5% dimethylaminopropylimino groups as a model PE. 100 ml. of undiluted poliovirus harvest containing $10^8$ PFU/ml. poliovirus was diluted 10-fold in distilled water to render the virus sensitive to adsorption to the PE. The 1-liter virus suspension was then treated with HCl to adjust the pH to 5.5 (to further enhance virus adsorption to the PE). One gram of the PE was then added to the virus suspension, and the suspension was mixed for 1 hour by a magnetic stirring apparatus to increase collision efficiency between virus particles and PE. The suspension was then centrifugated at 2000 r.p.m. for 5 minutes and the supernatant fluid was decanted to obtain the PE-virus complex. The supernatant fluid was examined for proteinaceous matter, and was found to contain the same amount of protein as was present in the virus suspension before addition of the PE. The virus was then eluted from the PE with tris(hydroxymethyl) aminomethane buffered saline, into a final volume of 10 ml. The eluate was examined and found to contain $10^9$ PFU/ml. of virus a concentration of 10-fold over the original virus, which contained $10^8$ PFU/ml. of virus. The eluate was also examined for protein, and none was detected by the methods used (precipitation with trichloroacetic acid).

(A) Poliovirus, adsorbed to the PE as described and recovered from the PE at a 10-fold concentration, was diluted 10-fold in distilled water to contain $10^8$ PFU/ml. This purified virus was injected intraperitoneally into 4 rabbits (weight 3–4 pounds) in 3-ml. doses, at weekly intervals for 4 weeks, and then the rabbits were exsanguinated and the serum obtained by centrifugation.

As a control, poliovirus stock (untreated) containing $10^8$ PFU/ml. of poliovirus was injected into 4 rabbits (weight 3–4 pounds) in the dosage and schedule described above, the animals were bled, and serum was obtained as described for purified virus. Although sera from both groups of rabbits contained the same amounts of antibody to poliovirus, the critical purpose of this test was to determine the response of the animals to non-viral proteins.

Gel diffusion studies were performed with the serum obtained from animals injected with the purified virus (PE eluate) in tests against stock poliovirus. With serum from the animals receiving PE-purified virus, only a single precipitin line was formed, indicating that the animals have responded only to the virus and not to other proteins contained in the stock poliovirus harvest. In contrast, serum obtained from the control animals injected with stock poliovirus showed 6 precipitin lines when tested against stock poliovirus; indicating that these animals had responded to the injection by synthesizing 6 different types of antibody, 1 being against the virus, and the remaining 5 against other proteins contained in the stock poliovirus harvest.

(B) Poliovirus (type 1) was concentrated on crosslinked isobutylene/maleic anhydride copolymer containing 5% dimethylaminopropylimide groups. The PE-virus complex was intradermally injected into each of a group of 4 rabbits (weight 3–4 pounds) using a calculated dosage of $10^8$ PFU. As a control untreated type 1 poliovirus harvest was intradermally injected into each of a group of 4 rabbits (weight 3–4 pounds) using $10^8$ PFU dosage. After 4 weeks the animals were bled and the serum was tested for ability to neutralize poliovirus. Serum from the animals injected with the PE-virus complex neutralized 100 PFU of poliovirus at a dilution of 1:30. In contrast serum from the control animals could not neutralize 100 PFU poliovirus at a dilution greater than 1:5. Thus the serium from animals that received the PE-virus complex was 6-fold higher in antibody titer than serium from the control animals. At the eighth week after inital injections the two groups of animals were again bled and the serum tested as above. Serum from the animals receive the PE-virus complex contained antibodies capable of neutralizing 100 PFU of poliovirus at a serum dilution of 1:35. In contrast the control animals yielded serum with a titer of no greater than 100 PFU of poliovirus. Thus the titer of antibodies was decreasing in animals that had received untreated poliovirus while the titer of antibodies in animals that had received the PE-virus complex increased slightly.

EXAMPLE 2

(A) Preparation

To 3 ml. of undiluted herpes virus containing $3\times10^6$ PFU/ml. of herpes virus were added 100 mg. of a methyliminobisopropylamine crosslinked isobutylene/maleic anhydride copolymer having 5% dimethylaminopropylimide groups. The resulting suspension was vigorously agitated. The suspension was centrifugated and the supernatant fluid was decanted to obtain a PE-virus complex. The PE-virus complex was resuspended in 3 ml. of distilled water. The suspension was centrifugated and the supernatant fluid was removed by decantation.

(B) The PE-virus complex of A was intradermally administered to each of 2 rabbits using a calculated dosage of $3\times10^6$ PFU/ml. of herpes virus. As a control untreated herpes virus harvest was intradermally administered to each of a group of 4 rabbits using $3\times10^6$ PFU/ml. dosages. After 4 weeks the animals were bled and serum obtained was tested for ability to neutralize herpes virus. Serum from the animals injected with the PE-virus complex neutralized 100 PFU of herpes virus at a dilution of 1:30. In contrast, serum from the control animals neutralized 100 PFU of herpes virus at a dilution not greater than 1:10. Thus, serum from animals that received the PE-virus complex was threefold higher in antibody titer than serum from the control animals.

EXAMPLE 3

(A) Preparation 3 ml. of undiluted herpes virus harvest containing $3\times10^6$ PFU/ml. herpes virus was diluted to $10^{-1}$ with distilled water. To the 30 ml. of diluted viral harvest were added 100 mg. of a methyliminobispropylamine crosslinked isobutylene/maleic anhydride copolymer having 5% dimethylaminopropylimide groups. The suspension was vigorously agitated. The suspension was centrifugated and the supernatant fluid was decanted to obtain the PE-virus complex. The PE-virus complex was resuspended in 3 ml. of distilled water. The suspension was centrifugated and the supernatant fluid was removed by decantation.

(B) The PE-virus complex of A was intradermally administered to each of 2 rabbits using a calculated dosage of $3\times10^6$ PFU/ml. of herpes virus. After 4 weeks the animals were bled and serum was tested for its ability to neutralize herpes virus. The serum from the treated animals neutralized 100 PFU of herpes virus at a dilution of 1:75.

EXAMPLE 4

A complex of styrene/maleic anhydride copolymer containing 100% dimethylaminopropylimide groupings and measles virus is prodced according to the general procedure of Example 1.

Rabbits are given intradermal administration of the PE-virus complex. Serum containing antibody against measles virus is obtained from the animals.

EXAMPLE 5

A complex of styrene/maleic anhydride copolymer containing 100% dimethylaminopropylimide groupings and vaccina virus is produced according to the general procedure of Example 1.

Rabbits are given intradermal administration of the PE-virus complex. Serum containing antibody against vaccina virus is obtained from the animals.

EXAMPLE 6

A complex of styrene/maleic anhydride copolymer containing 100% dimethylaminopropylimide groupings and echo 7 virus is produced according to the general procedure of Example 1.

Rabbits are given intradermal administration of the PE-virus complex. Serum containing antibody against echo 7 virus is obtained from the animals.

EXAMPLE 7

Immune serum obtained in the manner of the proceeding examples by injecting animals e.g. rabbits with a PE-virus complex to produce serum containing specific antibodies to the injected virus and then bleeding the animal is useful for the immunization of a living animal body against the virus. Immunization of the living animal body against specific virus is carried out by administering to the living animal body in known manner the thus obtained immune serum containing specific antibodies to the virus.

EXAMPLE 8

In the manner of the preceding examples, the basic polyelectrolytes of Preparations 2, 3, 5, 6, 8, 9 and 10 may also be converted to polymer-virus (e.g., polio virus) complexes in the manner of Preparation 11 and employed for injection into animals, e.g., rabbits, to produce specific antibodies in the injected animals and serum capable of neutralizing the virus of the polymer-virus complex at relatively great dilutions.

From the foregoing it will be obvious that the immunization procedure of the invention is applicable to animal viruses.

Such viruses include influenza, mumps, and Arbo virus, virus of the RNA-protein capsid type, for example, poliomyelitis virus, coxsackie virus and echo-7 virus, those of the RNA-lipid envelope type, such as measles virus, those of the DNA-protein capside type such as virus SV-15 and those of the DNA-lipid envelope type such as vaccinia virus and herpes virus.

In each case, the virus-PE complex is first formed as in the foregoing preparations and administration to a living animal body is carried out by injection according to the foregoing examples. Results in each case are an increase in the number of antibodies specific against the virus employed and incorporated into the PE-virus complex over that number of antibodies which would have been employed without employing the virus alone and not the PE-virus complex. The immunizations with the immune sera taken from the first treated animals represent substantial improvements over previously available immunizations due to the increased antibody titer and the greater extent of specific antigenicity obtainable when using the virus-PE complexes according to the invention.

The adsorption of a charged virus or protein specie to a charged insoluble substrate surface through electrostatic interactions between sites of opposite charge is related to the isoelectric pH (IEpH) of both species and to the pH of aqueous medium. The IEpH of any specie is that pH where electrical neutrality (+) to (−) on a number basis exists. At pH values above the IEpH, the individual specie is predominantly negative [more (−) charges than (+) charges] and is thus anionic in nature. Below the IEpH, the reverse is true and the specie is cationic. Electrostatic (ionic) interaction is promoted between species of opposite net charge.

A word of explanation is in order considering a model (an oversimplified system) of a polymer containing only one form of acid group (COOH) and one form of base group ($NR_2$) spaced randomly along the backbone chain:

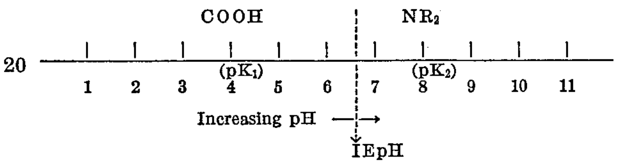

For model (non-polymeric materials) systems, (R)COOH will have a distinct acid strength of $pK_1$=pH4 and the base, $(R)NR_2$, will have a distinct acid strength of $pK_2$=pH8. However, polymeric (R)COOH (polyacid) will not titrate sharply at pH4 but will exhibit an extended ionization range of perhaps pH2 through pH8 with an apparent (average) acid strength (conventionally taken at 50% ionization) of $pK_1$=pH4. Similarly, polymeric $(R)NR_2$ (polybase) will not titrate sharply but may exhibit an extended ionization range from pH6 to pH9, again averaging at $pK_2$ (base) of pH8. Finally, when placed upon the same backbone (polyampholyte), the ionization ranges of each specie may further change and may in fact overlap, or due to mutual interactions, may shift the model $pK_1$ and $pK_2$ values either up or down the pH scale. These shifts depend upon, among other things:

(1) The acid/base, e.g., $COOH/NR_2$, ratio.

(2) Specific nature of acid and base, e.g., COOH and $NR_2$, i.e., pK values.

(3) Composition of backbone chain.

Such changes or group interactions affecting ionization are very pronounced for synthetic polyelectrolytes (PE's) where large numbers of groups are present with resultant smaller distances between groups. In proteins or virus protein shells the charged groupings are fewer in number and thus farther apart with resulting lower interaction effect. Additionally, proteins are further complicated since acid groups of different pK are present as well as base groups of different $pK_2$.

Referring once more to the model illustration as given above, the $NR_2$ group with apparent $pK_2$ at pH8 extending from pH 6 to 9, means that at all pH values <6, complete protonization of all $NR_2$ groups to the acid form $NH_2H+$ has occurred, and as pH rises from 6 to 9 increasing numbers of $NR_2H+$ become deprotonized (50% at pH8) until at pH9 only uncharged $NR_2$ exists.

The COOH group with apparent $pK_1$ at pH4, extending from pH 2 to 8, means that at all pH values <2 no ionized carboxyl ($COO^-$) is present and only the undissociated COOH is present. As pH is raised from 2 to 8 increasing amounts of undissociated COOH become ionized (deprotonated) to the base form $COO^-$ with 50% being achieved at pH4 and 100% at pH8.

It is thus clear that the number of (−) and (+) charges present at any given pH can and will vary depending upon (1) $pK_1$ of acid, (2) ionization range of acid, (3) $pK_2$ of base, (4) ionization range of base, (5) acid/base, e.g., $COOH/NR_2$, ratio, (6) Interactions of acid and base, e.g., COOH and $NR_2$, affecting $pK_1$ and $pK_2$ and ionization ranges.

(7) Types of acid, e.g., COOH, groups present if mixed.

(8) Types of basic, e.g., $NR_2$ groups present if mixed.

Additionally, media ionic strength and type of extraneous ions will further affect numbers 1, 2, 3, 4, and 6 above. Since IEpH is where numbers of (—) equals (+), then ionic strength charges also will alter IEpH.

Again referring to the above model example, on a mole unit basis having equal numbers of acid and base, e.g., COOH and $NR_2$, per mole, i.e., for example 50 of each, the $NR_2$ groups by definition exist as 25:25 $NR_2H^+:NR_2$ at pH8, an estimated 40:10 at pH7 and 50:0 at pH6. The COOH groups exist as 25:25 $COO^-$:COOH at pH4, an estimated 40:10 at pH7 and 50:0 at pH8. Exact ionization may be determined by electrometric titration. Thus equal numbers of (+) and (—) exist at pH7 and this is the IEpH. It follows that below pH7 the number of (+) groups predominate and the polymer is nominally cationic. However between pH 2 and 7 negative charges are also present. Above pH7 the number of (—) groups predominate and the polymer is nominally anionic. However between pH 7 and 9 positive charges are also present.

Depending on the $COOH/NR_2$ ratio which controls the total available numbers of (+) and (—) charges which can be realized in the system, several parameters change as the pH is varied away from the IEpH.

Net charge or (+) minus (—): At IEpH this is zero or (+)=(—). The farther below the IEpH the greater is the net (+) charge and the farther above the IEpH the greater is the net (—) charge.

Charge distribution: At IEpH this is equal or (+)=(—). Obviously higher percentages of (+) to (—) exist at pH's farthest below IEpH with the reverse true above the IEpH.

Total charge or (+) plus (—): if $COOH=NR_2$ then this is highest at IEpH but this can change variably with the $COOH/NR_2$ ratio in the ampholyte.

Ionic bridging is promoted between species of opposite net charge. However, since all charges are present at certain other pH values, charge distribution and total charge may also variably influence adsorption of oppositely net charged species as media pH varies from IEpH. This is especially so if the materials contain mixed species of acid and basic groups, e.g., COOH or $NR_2$ with widely varying pK's as is true in proteins, etc.

All of the foregoing applies to both synthetic PE's and to proteins or proteinaceous materials such as virus shells, etc., keeping in mind that proteins in general have far fewer acidic or basic components per mole and that these are mixed with respect to specie (pK). These latter properties make the determination of IEpH, charge density, charge distribution, and net charge more difficult for proteins than for synthetic PE's. If the IEpH of both systems is known, specific statements concerning adsorption may be made but as the total system becomes more complex (mixtures of proteins, virus, etc.) only generalizations can be made due to competing and/or interfering effects of the miscellaneous components present.

(I) Adsorption of single specie of known IEpH to PE substrate

Materials.—TMV, IEpH4 poliovirus, IEpH7.5 protein, IEpH(3–10) general case. Substrate:
Series of PE polyampholytes.

(1) Determine IEpH for series of PE and construct curve of IEpH vs. PE composition. Nature of media, i.e., water vs. saline (ionic strength) must be kept in mind. Generally IEpH in water is 0.5–1.5 pH units higher than in saline.

(2) For each composition the PE will be (—) at pH's higher than IEpH and (+) for pH's lower than IEpH.

(3) Draw in the IEpH line for specie to be adsorbed. IEpH should be in same media as used for (1) above.

(4) the TMV, polio, or protein is (—) at the media pH desired, then only those PE's which are (+) at this same pH will adsorb. Conversely, if the protein is (+) at the desired pH, then only those PE's which are (—) at this pH will adsorb.

Examples.—For TMV, IEpH=4. At all pH's above 4 it is (—) and thus requires a positive PE and only those PE's which are net (+) above 4 will work. The greater the net formal charge difference the better the adsorption so that the formal charge on both species must be considered. At pH's below 4 only those PE's which are net (—) at these pH's will work.

For polio IEpH=7.5, the same considerations apply and thus the PE's applicable to adsorb polio are different than those for TMV because of the IEpH differences between TMV and polio.

For conditions close to the IEpH of either specie the net charge is low and thus intermediate adsorptions can be expected.

Care must be taken in interpretation of results since the time of the experiment now enters the picture. For example the quantity of virus adsorbed may very well depend upon contact time and thus an intermediate adsorption may result from low contact time. Secondly, since the PE is an insoluble specie the ionization equilibrium is time dependent, varying between PE systems. Thus if equilibrium is not reached in the time of the experiment, an intermediate or small adsorption may occur.

Due to the fact that both (+) and, (−) charges are always present at most desired pH's, it is almost impossible to say that one condition yields zero adsorption vs. another condition giving complete 100% adsorption. Such values can only be determined if the assay method used permits and if all conditions were essentially optimum.

Essentially after choosing the PE from (4) above, one would vary pH, time, ionic strength, and type of extraneous inorganic ions to develop the maximum potential of the particular system.

(II) Adsorption of one component preferentially from two specie systems. (Same materials as I above.)

(1) Carry out first 3 steps in (I).

(2) Pick a PE whose isoelectric point is intermediate between those of the two adsorbing species and operate at a pH between that of the PE and either specie. The specie with the opposite sign will adsorb preferentially (perhaps quantitatively) to the other.

Example.—Thus for TMV and polio with a PE of IEpH=5 and operating at pH6, only polio will adsorb.

Additionally, if a PE is chosen with an IEpH of 8.5, TMV would adsorb preferentially to polio due to the greater net formal charge difference. Some polio may adsorb but now the TMV would be present in greater concentration and, after total elution, a second PE intermediate between TMV and polio may effect a better separation.

Again pH, ionic stregnth, and type of extraneous ions ($H^+$ vs. $Na^+$, etc.) should be investigated since these parameters will affect the adsorption of species whose IEpH's are close to the operating pH. Furthermore total charge and charge distribution at the operating pH may become important as will type of charge specie on either the PE or the specie to be adsorbed.

If mixtures adsorb, further separations are achieved by differential elution with elements of increasing ionic strength at a given pH or series of pH's. Thus fractions more loosely bound (less formal charge difference) will elute first, followed by species which are more tightly bound (greater formal charge difference).

(III) More complicated system (1) In this system the additional quantities and types of non-viral proteins present in the raw mixture complicates the simple picture (based on IEpH) due to the fact that all additional components have their own particular chemical composition, ionization parameters, and IEpH values. Further, some components may adsorb better through $H^+$ exchange while others appear to proceed best through $Na^+$ exchange. Thus possible pretreatment of PE to yield higher "activity" of the desired kind becomes of importance and must be determined since adsorption of the additional components may interfere with viral adsorption by occupying adsorption sites or by altering the charge on the PE substrate. This is especially true if total net charge is low to begin with.

The system described (pH vs. adsorption) for viral harvest (optimal pH at 4) applies here and these pH pictures are explained as being those values where the interfering substances adsorb least, thereby giving a greater number of sites for viral adsorption to occur.

From the foregoing, it will be obvious that the selectivity of viral adsorption in the presence of non-viral protein will be affected by the type and quantity of non-viral protein present as well as the pH at which the adsorption is carried out as well as other factors. If the type and quantity of non-viral protein is such that interference with viral adsorption occurs because of attachment to the available sites of the PE, thereby depleting them for virus adsorption, at least under certain conditions, it is apparent that procedural adjustments will have to be made by one skilled in the art to ensure viral adsorption and selective adsorption. Since any non-viral protein which does adsorb to the PE has optimum pH ranges for adsorption, as does the virus desired to be selectively adsorbed, one way of proceeding is to conduct a series of controlled pH experiments, varying the pH but maintaining the same PE adsorbent. In this manner, it can readily be determined at what pH's and pH ranges the contaminating or undesired non-viral protein do adsorb to the PE, and where they do not so adsorb. Since non-viral protein adsorption involves depletion of available attachment sites which could otherwise be employed for selective attachment of virus, carrying out the adsorption procedure, at those pH ranges where non-viral protein have been shown not to adsorb by such preliminary pilot experiment, results in enhanced and selective adsorption of the desired virus.

Since many embodiments of this invention may be made and since many changes may be made in the embodiments described, the foregoing is to be interpreted as illustrative only and the invention is defined by the claims appended hereto.

It is claimed:

1. A method for immunization of a lower vertebrate animal susceptible to attack by an animal virus comprising injecting into lower vertebrate animal a complex of the virus and a water-insoluble polyelectrolyte polymer which is a copolymer of (a) a monoolefin having 2 to 12 carbon atoms and (b) a member selected from the group consisting of maleic acid and maleic anhydride, said polymer containing 2–100% imide groupings selected from the group consisting of diloweralkylaminoloweralkylamide groupings and loweralkyliminodi(loweralkylimide) linkages the amount of said complex being sufficient to produce antibody specific against the virus.

2. The method of claim 1 wherein the polymer has a molecular weight of at least 1000.

3. The method of claim 1 wherein the virus is herpes virus.

4. The method of claim 1 wherein the virus is poliovirus.

5. The method of claim 1 wherein the polymer is isobutylene/maleic anhydride containing about 5% dimethylaminopropylimide groups.

6. The method of claim 5 wherein the virus is poliovirus.

7. The method of claim 5 wherein the virus is herpes virus.

References Cited

UNITED STATES PATENTS

| | | | |
|---|---|---|---|
| 3,178,350 | 4/1965 | Lund | 424—89 |
| 3,398,092 | 8/1968 | Fields et al. | 424—79 |

OTHER REFERENCES

Regelson, abandoned U.S. patent application Ser. No. 197,937, filed May 28, 1962, pages 3–15 and 37, referred to in Example 15 of the above-cited Fields et al. patent.

RICHARD L. HUFF, Primary Examiner

U.S. Cl. X.R.

424—79, 86